(12) United States Patent
Ikeda

(10) Patent No.: US 6,456,739 B1
(45) Date of Patent: *Sep. 24, 2002

(54) APPARATUS FOR RECOGNIZING CHARACTERS AND A METHOD THEREFOR

(75) Inventor: Hiroaki Ikeda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/666,680

(22) Filed: Jun. 18, 1996

(30) Foreign Application Priority Data

Jun. 19, 1995 (JP) ............................................. 7-151494
Jun. 20, 1995 (JP) ............................................. 7-153329

(51) Int. Cl.⁷ .............................. G06K 9/03; G06K 9/34
(52) U.S. Cl. ........................ 382/177; 382/185; 382/311
(58) Field of Search ................................ 382/187, 186, 382/185, 181, 177–179, 310, 309, 311

(56) References Cited

U.S. PATENT DOCUMENTS 5,233,672 A * 8/1993 Yamanari et al. ............ 382/310
5,502,461 A * 3/1996 Okamoto et al. ............ 382/187
5,509,092 A * 4/1996 Hirayama et al. ............ 382/177
5,517,578 A * 5/1996 Altman et al. ............... 382/177
5,517,586 A * 5/1996 Knowlton .................... 382/177
5,550,930 A * 8/1996 Berman et al. .............. 382/311
5,717,794 A * 2/1998 Koga et al. .................. 382/311

OTHER PUBLICATIONS

Leung et al., "IOCR: An Intelligent Optical Character Reader", Tencon '89 Fourth Institute Of Electrical And Electronics Engineers Region 10 International Conference, Nov. 22–24, 1989, pp. 70–73.

* cited by examiner

Primary Examiner—Jon Chang
(74) Attorney, Agent, or Firm—Fitzpatrick, Cella, Harper & Scinto

(57) ABSTRACT

A character image is inputted by use of a scanner, and recognized. The resultant character string of such recognition is represented on a display. The image serving as recognition source of the character designated on the display screen thereof, and the image in the vicinity of such image are represented. A character frame, which can discriminate the character image serving as recognition source, is edited in order to designate a new character image. This image and the inputted character information are registered on a character recognition dictionary correspondingly. Thereafter, the character recognition is carried out even with the utilization of such newly registered character. As a result, the recognition rate of the character recognition increases one after another.

35 Claims, 12 Drawing Sheets

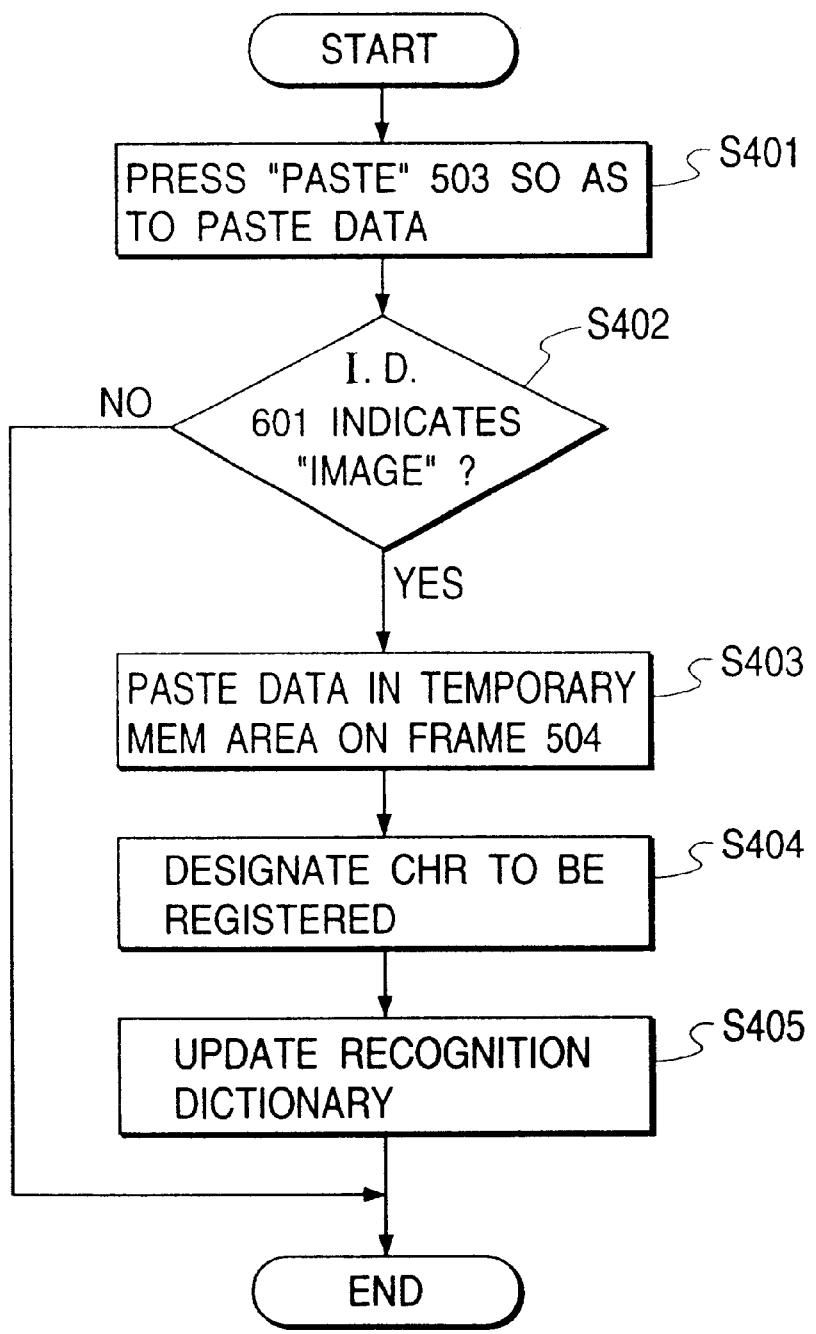

APPARATUS FOR RECOGNIZING CHARACTERS AND A METHOD THEREFOR

BACKGROUND OF THE INVENTION

1. Field of the Invention

The present invention relates to an apparatus for recognizing characters that recognizes the characters of inputted images, and a method therefor.

The present invention relates to an apparatus for recognizing characters that updates a dictionary for use of character recognition, and a method therefor.

The present invention relates to an apparatus for recognizing characters that facilitates the designating operation of the character image to be registered on a dictionary for use of character recognition, and a method therefor.

2. Related Background Art

An apparatus for recognizing characters is, in general, provided with a recognition dictionary that stores on it standardized distinctive feature of character images, and also, provided with means for cutting off characters, which is used for cutting off the character portion of an inputted image; means for identifying characters by computation in order to work out the degree of analogy between the character portion and the standard distinctive feature of each character stored on the recognition dictionary, and to output a character having the highest degree of such analogy as the result of recognition; and means for indicating the result of recognition, thus displaying the result of recognition. Here, as a method for enhancing the accuracy of such recognition for an apparatus for recognizing characters of the kind, there has been known a character registration. The character registration means designating a character image and a character code for the registration of the distinctive feature of a character image on a recognition dictionary in order to update the character dictionary.

Usually, the apparatus for recognizing characters, which is provided with such function of registration, is structured to be above to define a character image as an object of the intended character registration when such character image is selected as the one to be registered from among the results of recognition represented on means for displaying them. Here, in conjunction with FIG. 13, one example will be described, in which at first, a character 1301 that should be registered, such as a character correctly recognized or a character erroneously recognized, is selected by use of a cursor on the text window 1311 where the result of recognition is displayed. Then, an instruction is issued to begin a "registration" process by clicking a menu 1302 or the like. On the window 1312 for use of the character registration, the character image 1303 corresponding to the selected character 1301 is displayed within an image frame arranged for use of a character to be registered. Thus, the character image is inputted into a character input unit 1304 by use of a keyboard or the like in order to designate the nature of that particular character of the image. If there is no problem as to its contents, an "OK" button 1305 is depressed, hence registering the character on the recognition dictionary. The representation of the character image 1303 is such that the character 1301 designated by use of the cursor is let out for the recognition process, and then, the image information thus processed is represented on the displaying means. The image information per unit of cut off character or the coordinate information of a cut off character image is stored corresponding to the text of a recognition result one to one. Such stored information is utilized for the execution of the representation of the character image.

However, in accordance with the example described above, it is impossible to register the image area that has been cut off and defined by means of an apparatus for recognizing characters. Therefore, no modification is possible. Inevitably, a registration should be made as it is even when the character cut off is a failure. Also, there is a drawback that it is impossible to utilize for registration any image that exists outside the area from which a character has cut off by means of an apparatus for recognizing characters.

SUMMARY OF THE INVENTION

The present invention is designed in consideration of the problems described above, which are encountered when applying the conventional technique. It is an object of the invention to facilitate the designating operation of the character image to be registered on a recognition dictionary.

The present invention is structured to utilize the information regarding the area of the cut off character provided by use of an apparatus for recognizing characters, and to edit such character area in order to set the character image to be registered on a recognition dictionary. In this way, it is made easier to define a character image for an intended registration more accurately.

Also, the present invention makes it possible to designate a character image to be applied to updating a recognition dictionary by carrying out an operation on the screen of a display with a sense as if writing it down, thus enhancing the operativity thereof.

BRIEF DESCRIPTION OF THE DRAWINGS

FIG. 4 is a flowchart showing the pasting process of data that utilizes the identifier indicating the kind of data.

DETAILED DESCRIPTION OF THE PREFERRED EMBODIMENTS (First Embodiment)

Figure 1:
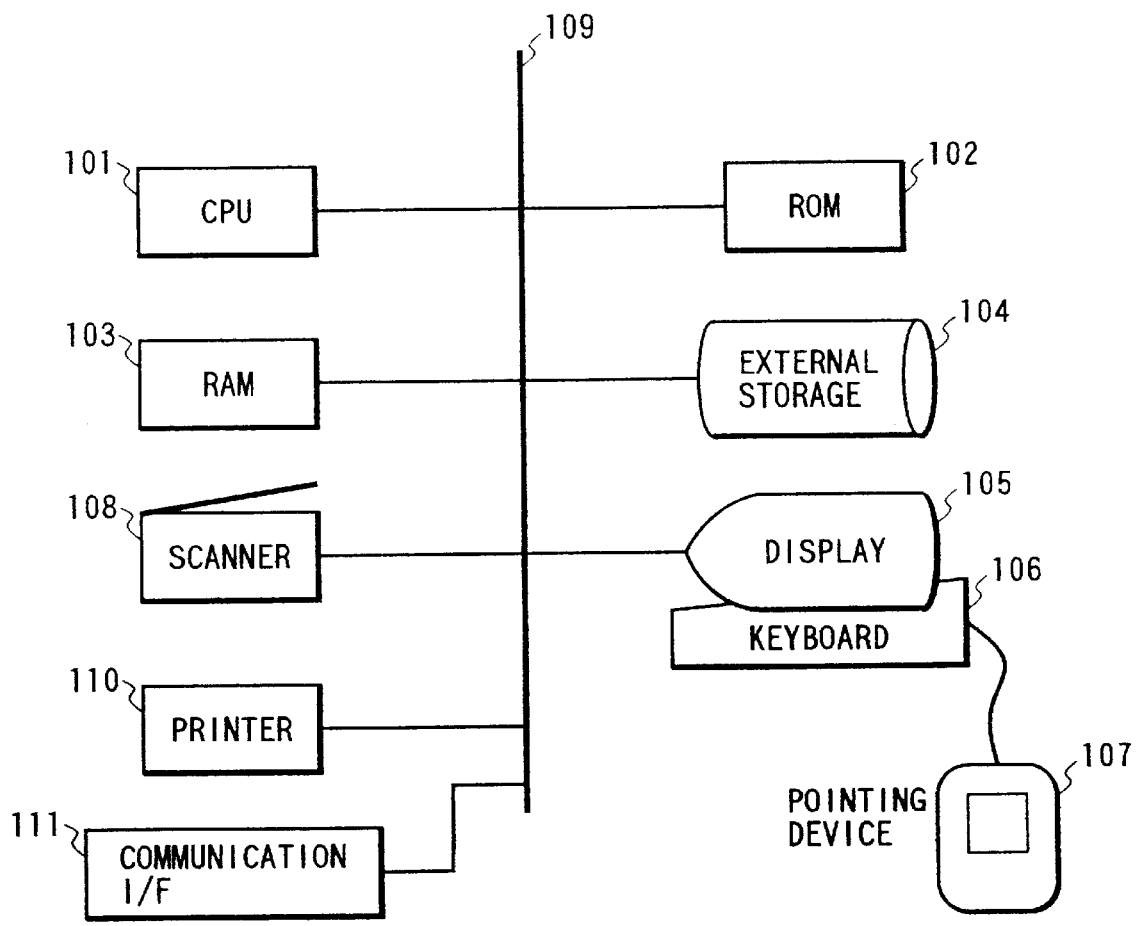
FIG. 1 is a block diagram which shows the structure of an apparatus in accordance with the present invention.

FIG. 1 is a block diagram showing the structure of an apparatus for processing images that executes the character recognition processes in accordance with the present invention. In FIG. 1, a reference numeral 101 designates a CPU that executes the control of the apparatus as a whole in accordance with a control program stored in a ROM 102. The ROM 102 stores the control program of, the processes to be executed by the apparatus, such as the processes to be executed in accordance with the flowcharts prepared for the CPU 101 to follow, which will be described later, and data on a recognition dictionary, among others. A reference numeral 103 designates a RAM that functions as a storage for its work area, document images and other data, which become processing objects, and also, stores data inputted through a communication I/F; 104, an external storage that can be attached to or detached from the apparatus, such as a magnetic disc; 105, a display such a CRT or a liquid crystal indication device; 106, a keyboard; 107, a pointing device such as a mouse; 108, an image scanner for reading images from a source document; 110, a printer of LBP or an ink Jet type for printing out a text in accordance with the result of character recognition; 111, the communication I/F, which controls the transfer of data between the apparatus and other apparatuses through public lines or the like to make it possible to control the input of image information, the output of the recognition result, and the transmission and reception of data to be used for updating a dictionary, which is significantly related to the invention taken out by the application hereof, and also, to control the reception of the control program used for the processes to be executed by the apparatus, as well as the storage thereof on the RAM 103; and 109, data bus used for transferring data between each of the structural units of the apparatus.

In this respect, a user's recognition dictionary is stored on the external storage 104. This dictionary is separated from the main character recognition dictionary. The user can freely register or delete characters. The character registration process described below is a registration process of character data onto this user's dictionary. Here, the method applicable to the user's dictionary is not necessarily confined to the one whereby to set such dictionary separately from the main character recognition dictionary, either, but it may be possible to make an arrangement so that the main character recognition dictionary itself can be updated by means of the character registration process to be described hereunder.

With reference to the flowchart shown in FIG. 2 and the state of representation of a display 105 shown in FIGS. 3A to 3C, a description will be made of the outline of the present embodiment to be executed by the character recognition apparatus, the structure of which is represented in FIG. 1. The figures depict a process of recognizing and registering Japanese characters. However, it is to be understood that Japanese characters are only one example of characters, and that the invention is applicable to other types of characters as well.

Figure 2:
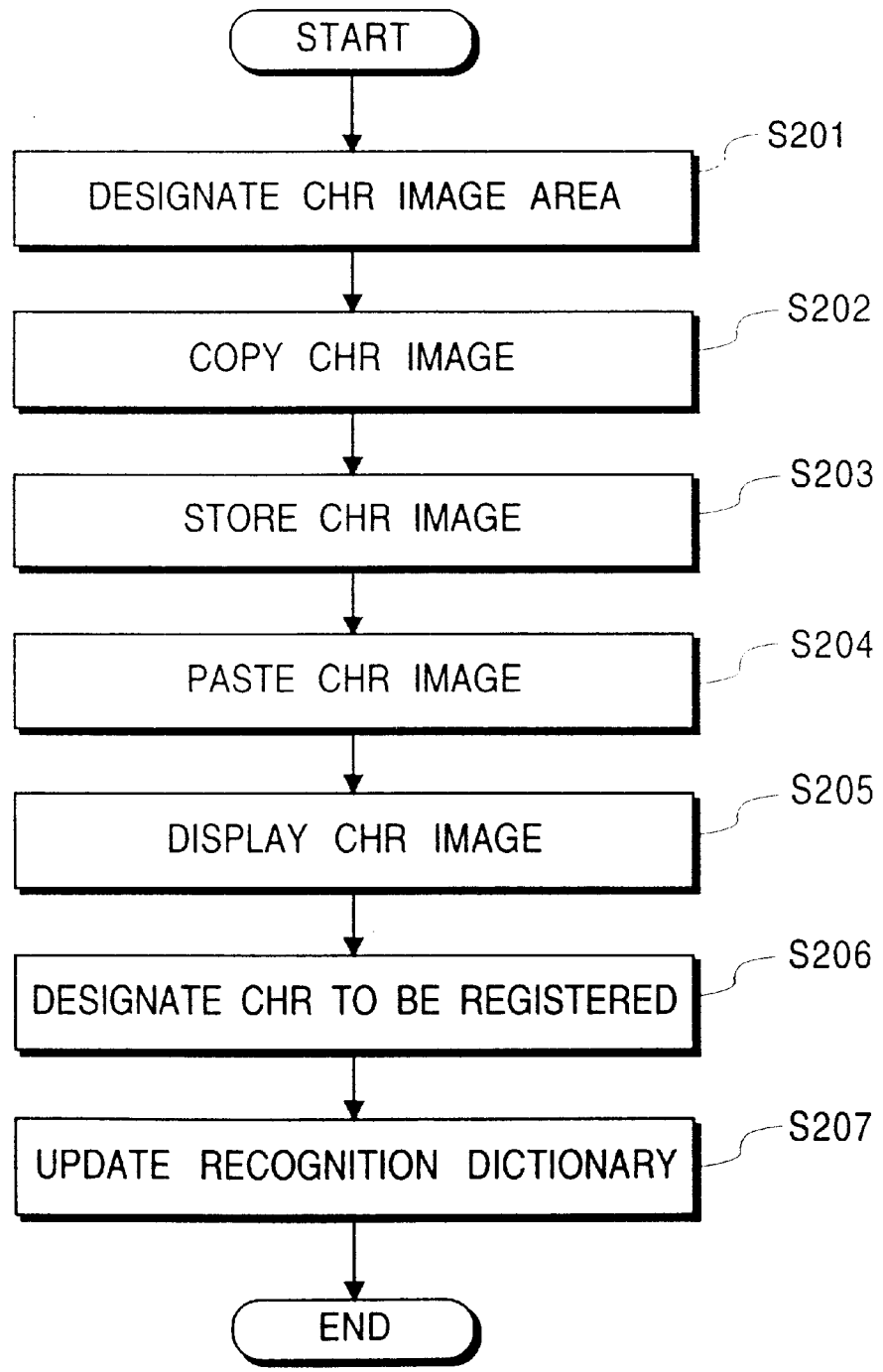
FIG. 2 is a flowchart which shows the character registration process as a whole in accordance with a first embodiment of the present invention.
Figure 3A:
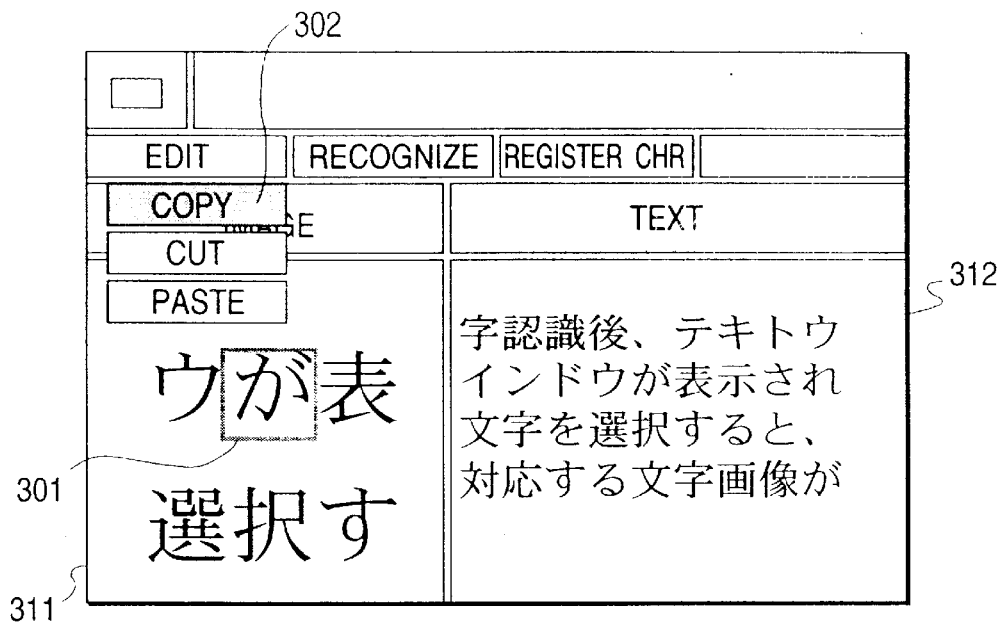
FIGS. 3A to 3C are views showing the display examples of character registration processes referred to in the flowchart represented in FIG. 2.
Figure 3B:
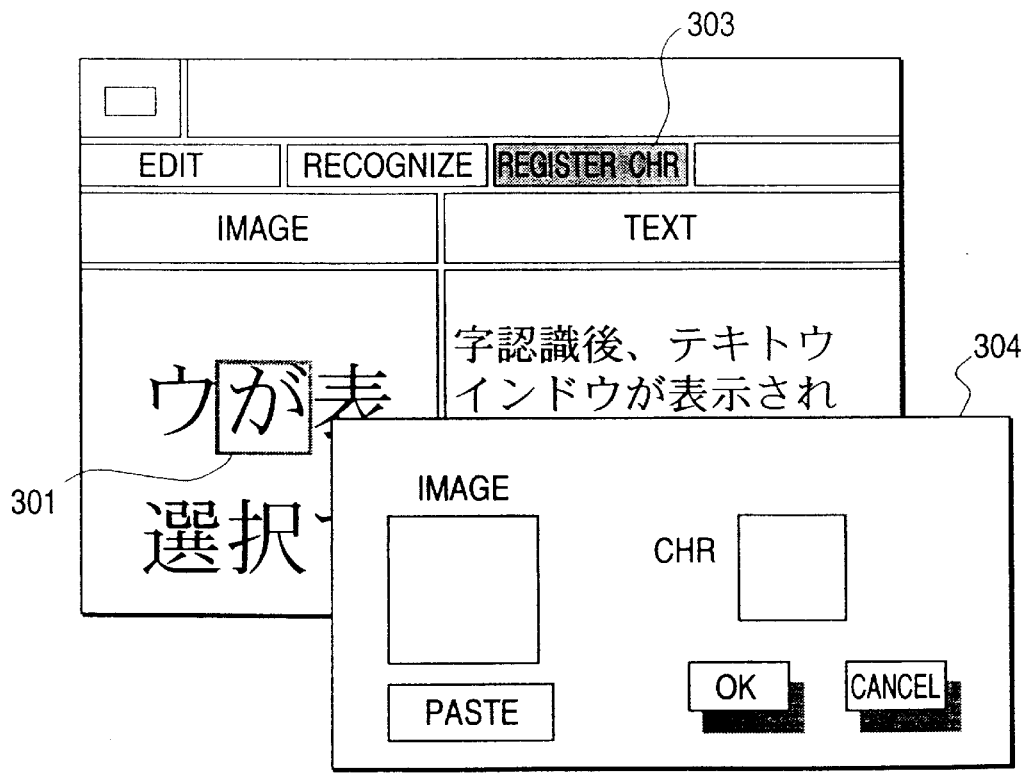
Figure 3C:
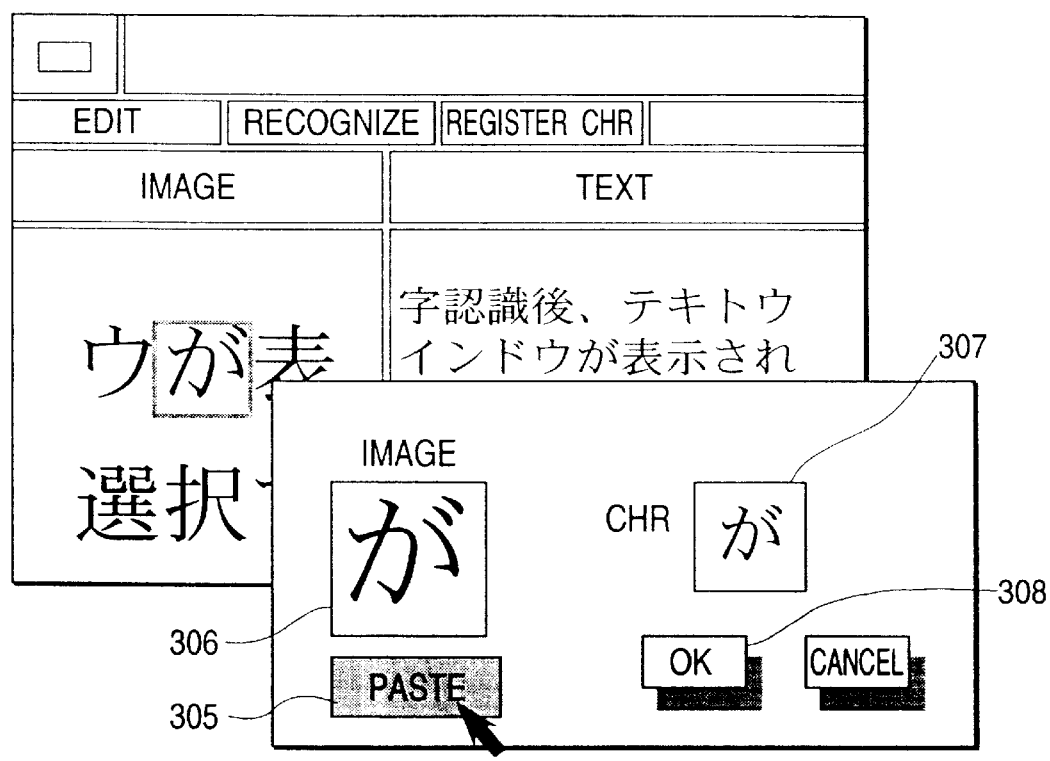

Here, FIG. 2 is a flowchart showing the details of the character registration process. This process begins after an image, which is inputted by means of a scanner 108 or the like, has been recognized by its character, and also, after the objective image for recognition has been displayed in the image representation frame 311, while the text showing the result of recognition has been displayed in the text representation frame 312 as shown in FIG. 3A.

At first, in step S201, the area of a character image of an inputted image is designated for the intended character registration by means of a mouse 107 or the like. A coordinate information of the area designated by the mouse 107 is converted into the coordinate information regarding the inputted image, and stored on the RAM 103. In accordance with this coordinate information, the designated area is displayed at 301 as being surrounded by a rectangle. Then, in step S202, "Copy" 302 is selected from among the menu items. In step S203, the image in the rectangle 301 is stored on the temporary memory area of the RAM 103 for use of a character image to be registered. After that, when the "Register" 303 is selected by the mouse 107 from among the menu items, the window 304 for use of character registration is displayed as shown in FIG. 3B. In response to the depression of the "Paste" button 305 (S204), the image stored on the temporary memory area (on the RAM 103) in the step S205 is displayed in the image representation frame 306 as shown in FIG. 3C. In step S206, a character information is displayed on the character input unit 307 to indicate the nature of the character image, which is inputted by means of the keyboard 106. After having confirmed the contents of the intended. registration, the "OK" button 308 is depressed. In response to this button being depressed, a dictionary data is additionally stored on the recognition dictionary so as to enable the image in the image representation frame 306 and the character in the character input unit 307 to correspond with each other. Thus, the updating of the recognition dictionary terminates (S207).

In this respect, when the designated character image 301 is stored on the temporary memory area in the step S203 or the updated data stored on the temporary memory area in the S205 is displayed in the image representation frame 306, a regulation process is carried out to adjust the size of the designated character image 301 to be suitable for the intended character registration.

Also, for the updating process of the recognition dictionary in the step S207, the data on distinctive feature for use of recognition is extracted from the character image in the image representation frame 306 in response to the depression of the "OK" button 308. A data is then prepared to enable the data on distinctive feature thus extracted and a character code in the character input unit 307 to correspond with each other. This data is stored on the recognition dictionary.

Also, as an updating process of the recognition dictionary, there is a method besides the one in which the data on distinctive feature of a character and a character code are simply arranged to correspond with each other in order to prepare an additional data as described above. The other method may be such that an updating is carried out by merging the characteristics of a recognition dictionary already in use in order to combine a newly stored data with the data on which the character code for the new registration has been already stored, thus remaking the data on distinctive feature for recognizing the updated character code.

As described above, it is possible to effectively designate a character registration image irrespective of the portions of the inputted image. Therefore, the character registration is carried out successfully even when the character cut off fails or even if the character recognition of a character image is not executed, but identified as noises when recognizing the inputted image.

In this respect, the description has been made of the minimum structural requirements for implementing the present invention in accordance with the embodiment described above. For example, however, it may be possible to arrange the structure so that the process program to execute the present invention, and data on a recognition dictionary and others are supplied from the outside sources to a general purpose computer through external storage means 104 or communication I/F 111, and that these program and data are stored in the RAM 103 in advance. Here, the storage is not necessarily limited to the RAM 103, either.

Also, the flowchart shown in FIG. 2 is such as to show only the processes related to the present invention. However, it may be possible to arrange the structure so that a step is added between the steps S203 and S204 to enable a process unrelated to the present invention to be executed unless such process allows the contents of the temporary memory area to be modified, for example.

Figure 5:
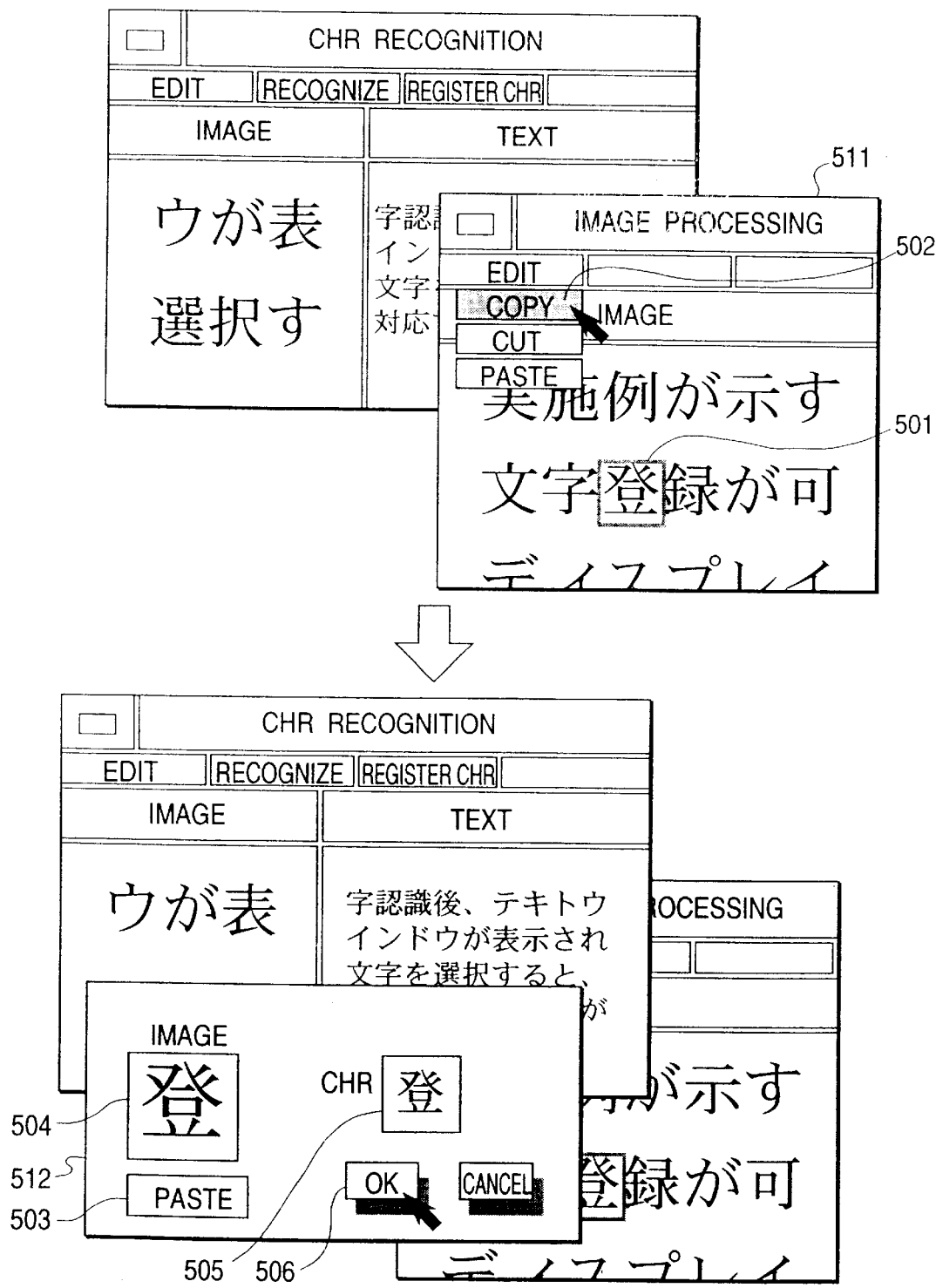
FIG. 5 are views showing the display examples of character registration processes in accordance with data pasting.

Now, in conjunction with a flowchart shown in FIG. 4 and the state of a display 105 shown in FIG. 5, the description will be made of another embodiment to be executed by an apparatus for recognizing characters whose structure is represented in FIG. 1. The present embodiment is mainly implemented by use of a general purpose computer.

Figure 6:
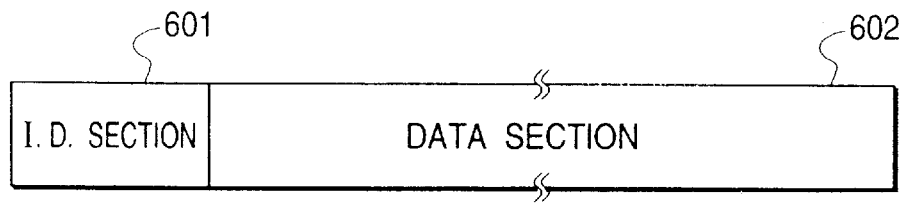
FIG. 6 is a view which shows the example of data structure in a memory.

As shown in FIG. 6, the temporary memory area provided for this apparatus comprises an identifier 601 and data section 602, thus making it possible to identify the kind of stored data, whether the data is for an image or a character string, by use of the identifier 601. For example, if only a structure is arranged to execute another program on this apparatus, and to store data on the data section of the temporary memory area as shown in FIG. 6, an image is represented in the rectangle of the character image 501 designated by use of the mouse 107 through the "Copy" button 502 on the menu, and stored on the data section 602 of the temporary memory area. Now, since a window on which such designation is implemented becomes an image process window 511, the information regarding such image is assigned to the identifier 601. The flowchart shown in FIG. 4 deals with the detailed process of a character registration subsequent to the storage arrangement of data for the temporary memory area.

A character registration process is on demand when clicking a menu button (not shown). Then, in order to arrange a display in the image representation frame 504 on the character registration window 512, which appears in response to this designation given by clicking, the "Paste" button is depressed in step S401 to designate pasting the data stored on the temporary memory area onto the image representation frame 504, at first. Then, in S402, it is examined to ascertain whether or not the identifier of the temporary memory area indicates an image. If negative, the pasting is impossible, thus terminating the process. If affirmative, the data on the temporary memory area is displayed on the image representation frame 504 in step S403. In step S404, by means of the keyboard 106, the character of such character image is inputted into the character input unit 505. After confirming the contents of the intended registration, the "OK" button is depressed. Thus, a data that enables the character image in the image representation frame 504 and the character input unit 505 to correspond with each other is stored on the recognition dictionary. In this way, the updating of the recognition dictionary is completed (S405).

As described above, data is stored together with an identifier on the temporary memory area that does not specify any kind of data. Therefore, it is possible to transfer image data irrespective of the character recognition process. Thus, an effect is obtainable that a character registration is executable even when no image is inputted for the character recognition process.

(Second Embodiment)

Hereinafter, with reference to the accompanying drawings, the detailed description will be made of a second embodiment in accordance with the present invention.

Whereas the previous embodiments are the examples in which the position of the character image to be registered on a recognition dictionary is designated on the display screen where the inputted image is represented, it is intended for the present embodiment to describe a technique such as to utilize the character area information for the designation of the character image, which is obtainable by the controlled character cut off process executed by an apparatus, and then, to edit this character area in order to carry out the "designation of character image".

The structural block diagram of an apparatus for recognizing characters in accordance with the present embodiment is the same as that of the first embodiment, which is the same as FIG. 1.

Figure 7:
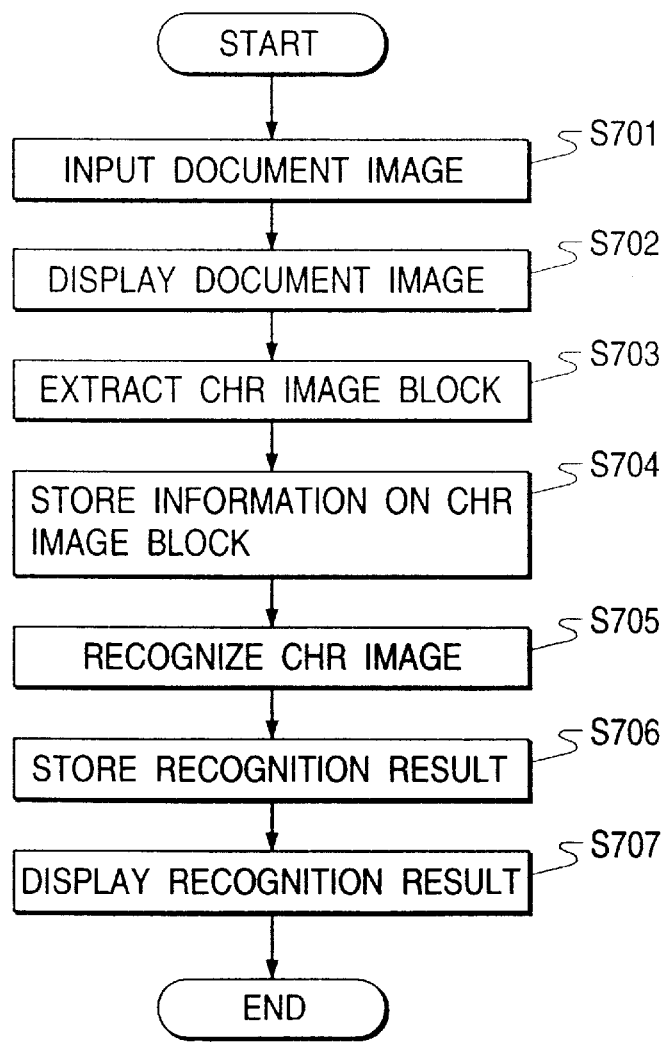
FIG. 7 is a flowchart which shows the character recognition process as a whole.

With respect to the apparatus for recognizing characters of the present embodiment structured as described above, the outline of the procedures up to the representation of the result of character recognition will be described in conjunction with a flowchart shown in FIG. 7.

At first, in step S701, a document image is inputted by use of an image scanner 108 for the storage of such image on a RAM 103. In step S702, the inputted image is represented on the display 105.

Then, in step S703, the character image block is extracted per character from the inputted document image. The information regarding the position, the size, and others of the extracted character image block is stored on the RAM 103 in step S704. In this respect, the recognition area within the inputted image may be the one predetermined by means of the apparatus or the one designated by the operator.

When a character image block is extracted, the amount of distinctive feature of each of the characters is extracted in step S705, thus carrying out a computation for the intended recognition with reference to a recognition dictionary. In step S706, the result of such computation (character code group) is stored on the RAM 103, and at the same time, the result of recognition is represented on the display 105 in step S707.

Figure 8:
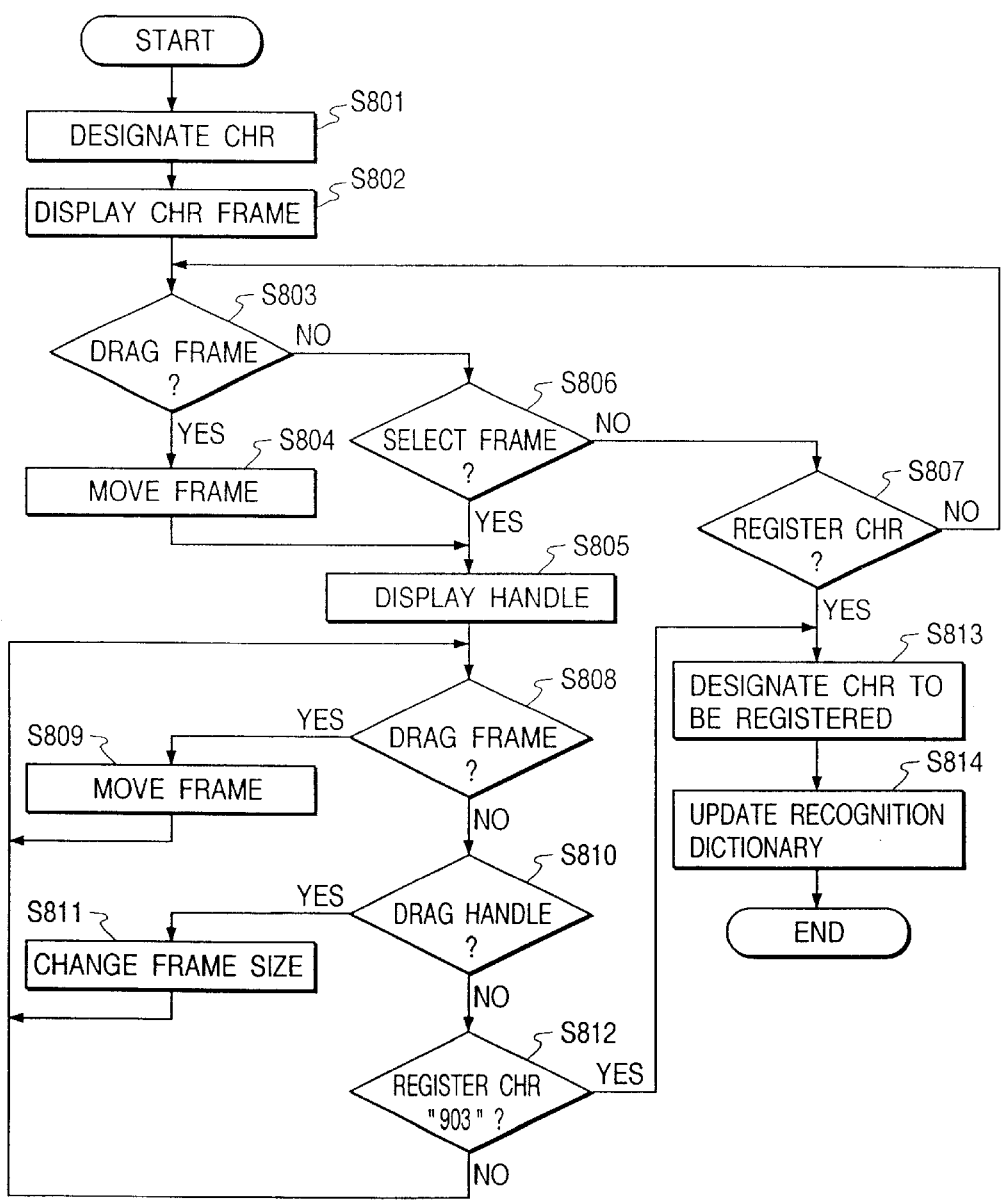
FIG. 8 is a flowchart which shows the character recognition process in accordance with a second embodiment of the present invention.

The character registration is to be executed after the completion of such character recognition process. The outline thereof will be described in conjunction with a flowchart shown in FIG. 8 and the states of display 105 each shown in FIGS. 9A to 9E.

At first, in step S801, a desired character to be registered or an appropriate character 901 is designated (see FIG. 9A) on the text window 910 where the result of recognition is represented. Then, in step 802, with reference to the information stored in the step S704 and step S706, an image near the position of the document image corresponding to the designated character is represented on the image window 911, and at the same time, a corresponding character cut off frame 902 is displayed (see FIG. 9A). The information regarding the character cut off frame 902, which is displayed in the step S802, is the positional information of the corresponding data on the character image read out from the character data designated in the step S801 by making an access to the data on the recognition result of the currently represented image, which is stored on the RAM 103. In this respect, for the data on the recognition result stored on the RAM 103, the character code string that represents the recognition result, and the positional information regarding the character image for one character portion obtained as the recognition result of each of these character codes are stored in such a mode that each of them can be found correspondingly as a relative positional information for the image data as a whole, in addition to the image data whose recognition process has been completed.

Here, if the displayed character cut off frame 902 is not found to be corresponding to the character 901 on the designated text window 910, it is possible to change the size and position of the frame 902. To change the size and position thereof, the cursor interlocked with the mouse 107 should be brought to the inner portion of the displayed character cut off frame 902, and then, a button provided for the mouse 107 is depressed once (called "click"), and the mouse 107 is caused to move with the button being depressed (called "drag").

With the operation of a click, the step S806 becomes affirmative. Then, the process proceeds to step S805. Also, with the operation of a drag, the character cut off frame can shift (step S804), and the process proceeds to the step S805.

In either case, the process proceeds to the step S805. Here, a character cut off frame having handles 904 is displayed so as to make the size of the cut off frame changeable.

There are eight handles 904 in total. Any one of them can be dragged by use of the mouse 107, thus changing the size of the character cut off frame. For example, of the eight handles, the four handles each at the four corners of the cut off frame 902 can be used for changing the size of the cut off frame while maintaining the shape of the cut off frame 902 as it is (see FIG. 9D). Each of the handles located in the center of the four sides is used for changing the size in the vertical or horizontal direction. Any one of the changes can be made by operating a drag.

Figure 9A:
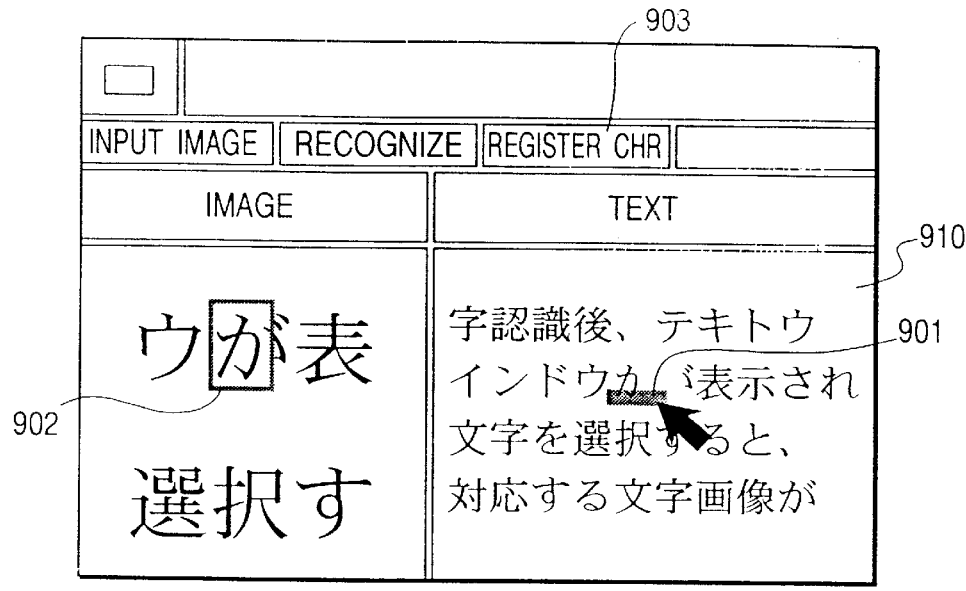
FIGS. 9A to 9E are views showing the display examples of character registration processes in accordance with the flowchart represented in FIG. 8.
Figure 9B:
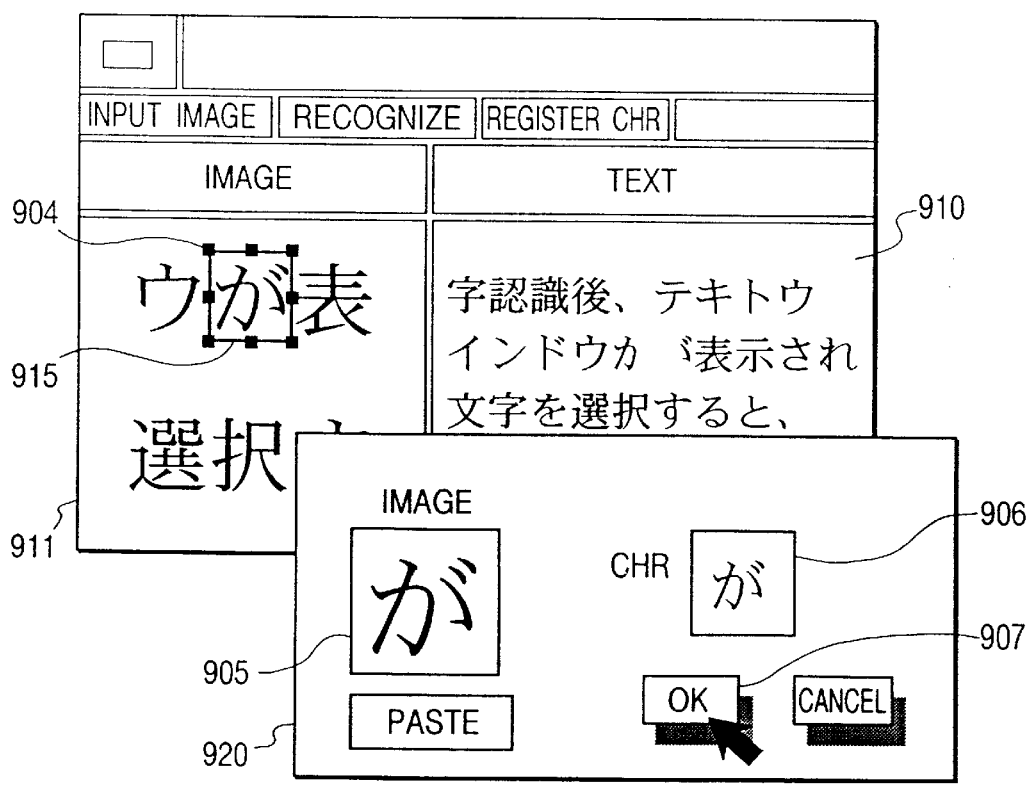
Figure 9C:
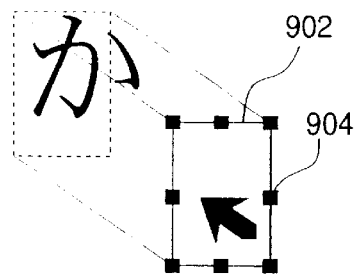
Figure 9D:
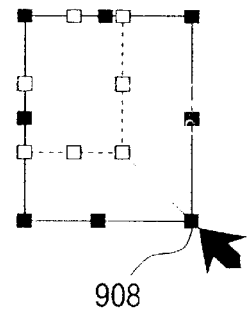
Figure 9E:
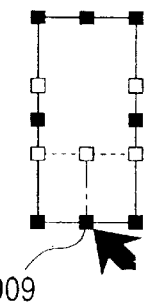

Also, if a drag is operated while designating a portion other than the handles of the cut off frame 902 (inner side of the cut off frame or the like, for example), it is possible to move the cut off frame as it is (see FIG. 9C).

The movement of the cut off frame 902 or the size modification process is determined in the step S808 or step S810 where a decision process is carried out, and then, the movement or size modification process is executed in step S809 or step S811.

In the case represented in FIG. 9A, an image should be recognized as one character "ⁿ𝑓ⁿ". However, in the intended character cut off process, this character is separated into two character images, "ⁿ𝑓ⁿ" and "ⁿ𝑓ⁿ", in accordance with the resultant representation. Thus, the operator should enlarge the cut off frame 902 in the horizontal direction in order to modify the cut off size.

Now, during the operation described above, the operator clicks the "Character Register" button 903, which appears on the upper portion of the screen shown in FIG. 9A. Then, the process proceeds from step S812 to step S813, and on the screen of the display, a pop up window 920 appears as shown in FIG. 9B including the current image 905 in the cut off frame 915 and the character 906 designated by means of the text window 910.

In the current state of the present embodiment, the result of recognition should appear as "ⁿ𝑓ⁿ", but actually, it has appeared as "ⁿ𝑓ⁿ". Therefore, by means of the keyboard or the like, this should be modified to be "ⁿ𝑓ⁿ" (step S813). The result thereof is shown in FIG. 9B. In this respect, if the character is a Chinese character, the intended character is inputted by use of the Japanese/Chinese character conversion system or the like. Here, the description is made exemplifying a Japanese character string, but it may be possible to update a recognition dictionary even for English letters. Now, for example, a letter should be recognized as "K", but actually, if it has appeared separately as "I" and "<", the character image data on which the letter "K" has been recognized as "I" should be enlarged to recognized it as "K" as originally intended for updating the recognition dictionary.

Then, when the "OK" button 907 in the pop up window 920 is clicked, the cut off character image 905 displayed on the pop up window 920 and the character code of the text character "ⁿ𝑓ⁿ" are allowed to be corresponding with each other, and the amount of the distinctive feature of the character image 905 is extracted. Thus, the character "ⁿ𝑓ⁿ" is registered on the recognition dictionary with its amount of the characteristic feature and the character code being arranged to correspond with each other.

As described above, while applying the conventional operation as it is when registering a character image as a character in accordance with the result of recognition, the image to be registered can be designated by moving the character cut off frame of an image corresponding to the character obtained as a result of recognition or changing the size thereof. Therefore, it is possible to obtain an effect that the character registration is made successfully even if the character cut off fails or a character image cannot be recognized as a character within the inputted image.

Here, in accordance with the present embodiment, the description has been made of the minimum structural requirements for implementing the present invention, but it may be possible to arrange the structure so that the process program for implementing the present invention, the data on a recognition dictionary, and others are stored on a floppy disc or the like so as to supply them to a general purpose computer from the outside or store them on an external storage 104 for storing them on the RAM 103. In this respect, the storage is not necessarily limited to the RAM 103.

Also, the image within the character cut off frame is displayed on the image area 905 at the time of executing the character registration. However, it may be unnecessary to display such image. Also, it may be possible to arrange a structure so that the character registration process is immediately suspended if any process unrelated to the present invention takes place, because in accordance with FIG. 8, only the process related to the present invention is illustrated. Further, there is no problem at all whether decisions are made in order of the steps S803, S806, and S807, and the steps S808, S810, and S812 or in any other order thereof.

Also, when recognition fails completely, it is possible to easily find the position of a target character image (the character image whose recognition has failed) just by designating a character nearby even in a case where a specific sign is displayed on the text window 910, because the cut off frame is displayed with respect to the character image in the vicinity of the target character in the document image whose recognition has failed.

For the present embodiment, it may be possible to arrange a structure so that the initial value can be automatically defined for the character code of a character to be registered. Hereunder, such example will be described in detail.

Figure 10:
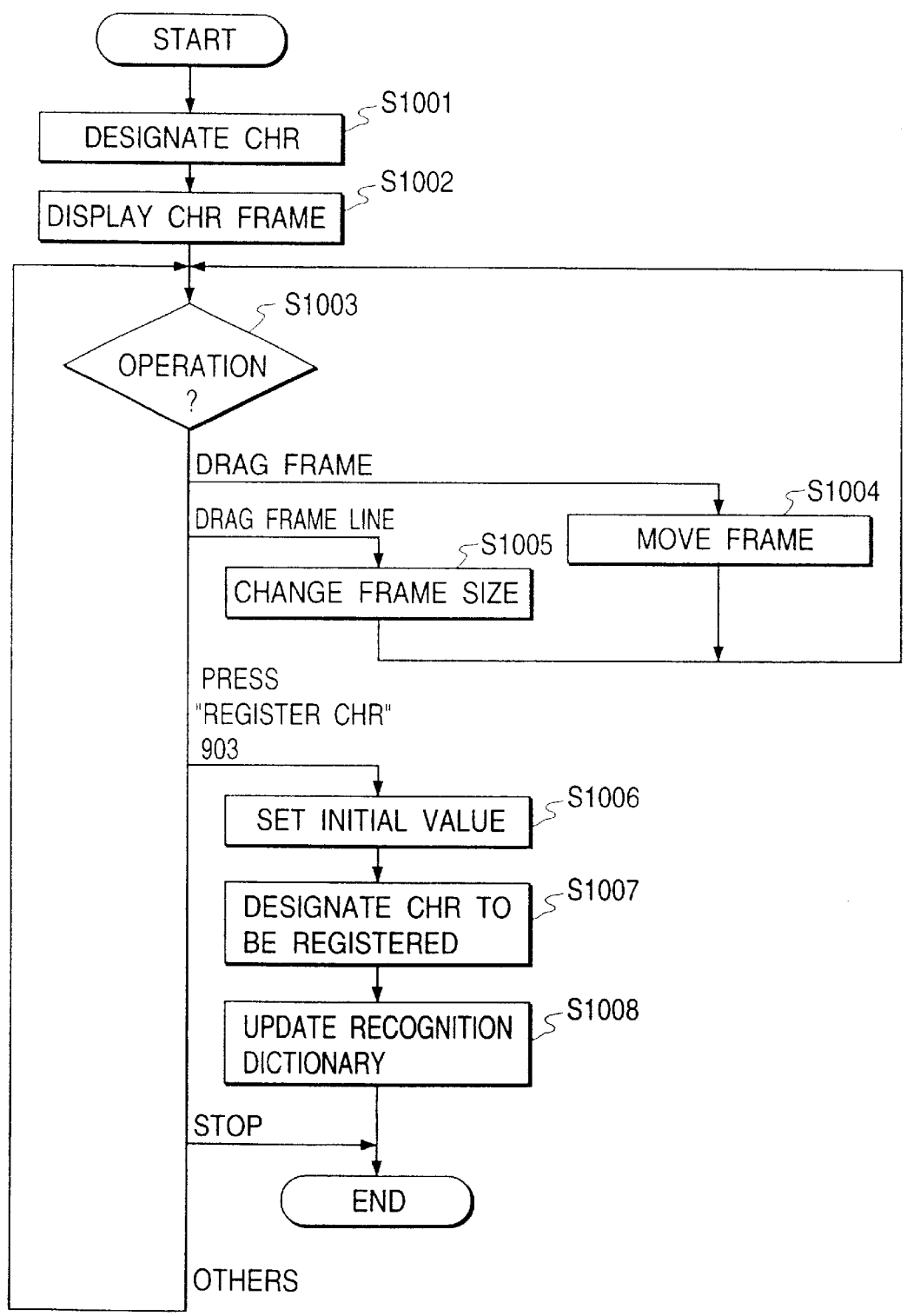
FIG. 10 is a flowchart which shows the character registration process that utilizes a designated character as initial data for the data to be registered.
Figure 13:
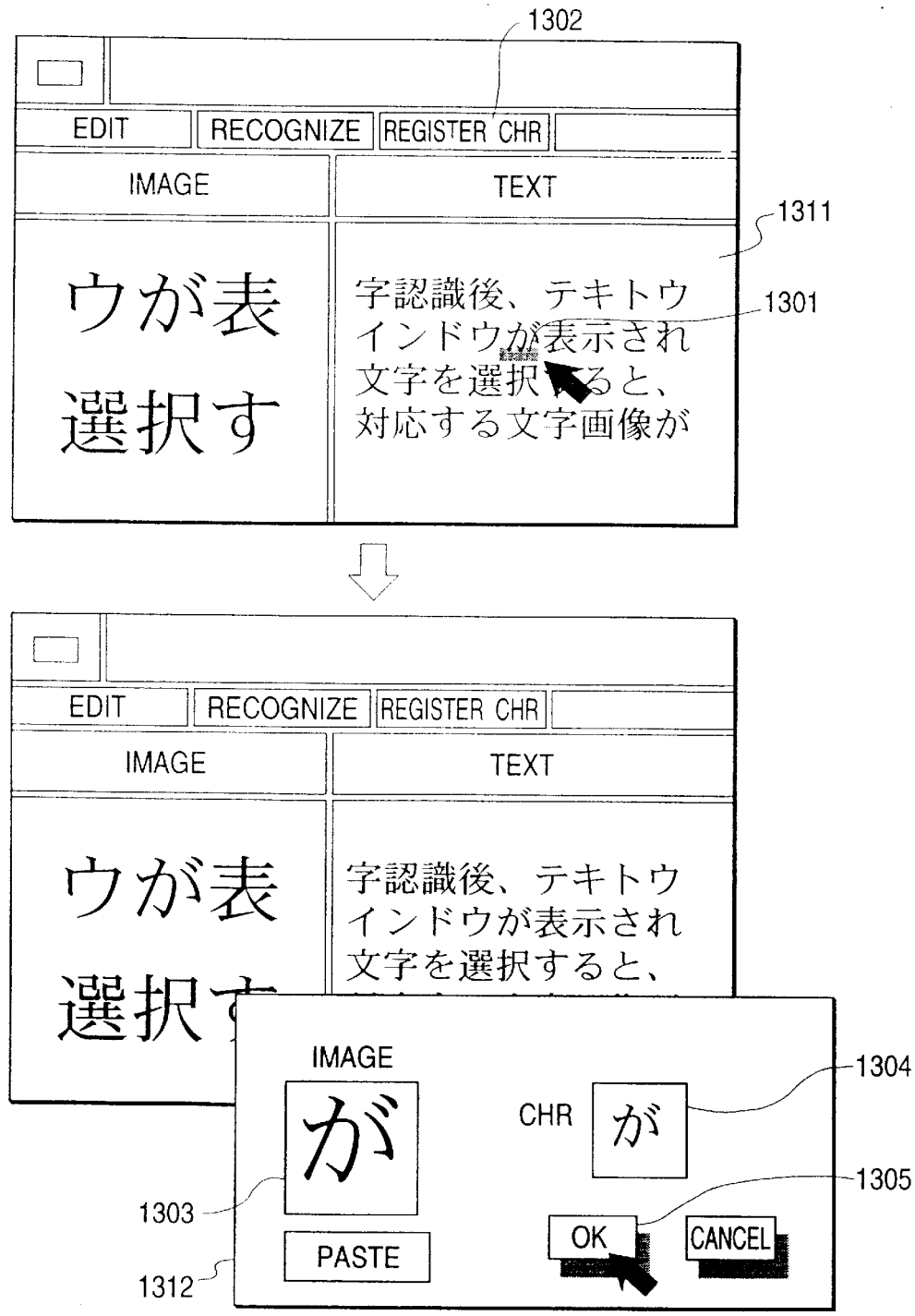
FIG. 13 are views illustrating the display examples of character registration processes in accordance with the prior art.

FIG. 10 is a flowchart showing the process procedures. (The corresponding control program is stored on the ROM 102).

At first, in step S1001, a character is designated on the text window 910 that represents the result of recognition. In step S1002, the character cut off frame 902 corresponding to the designated character is displayed on the image window 911 that represents the inputted image in accordance with the information stored in the step S704 and the step 806 (see FIG. 7). At this juncture, it may be possible to display the handles 904 on the character cut off frame 902 as described earlier in conjunction with FIGS. 9A to 9E.

Then, in step S1003, the operation of this apparatus is detected.

At first, when the dragging of the character cut off frame is detected, the process proceeds to step S1004 where the character cut off frame 915 is caused to move. Also, if the frame line 915 of the character cut off frame 915 is dragged, the precess proceeds to step S1005 where the size of the character cut off frame changes depending on the dragged position and direction.

Figure 11:
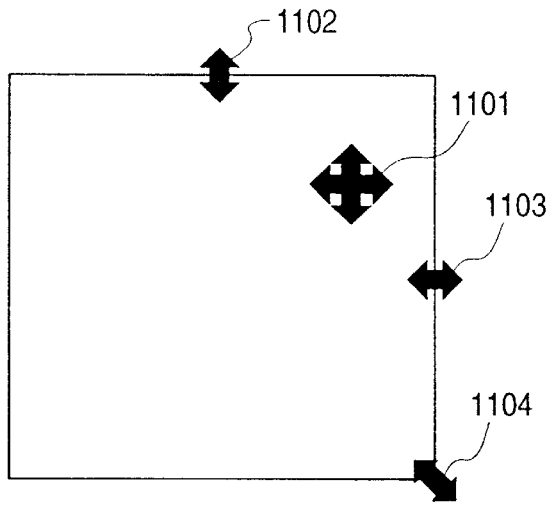
FIG. 11 is a view which shows an example of mouse cursor used for editing process of a character cut off frame.

As shown in FIG. 11, it becomes easier to handle the character cut off frame if the shape of the cursor is changed as designated by a reference numeral 1101 when the character cut off frame should move; by 1102 when the size of the character cut off frame should change in the vertical direction; by 1103 when the size thereof should change in the horizontal direction; and by 1104, when the size thereof should change in the upper left direction or lower right direction.

Figure 12:
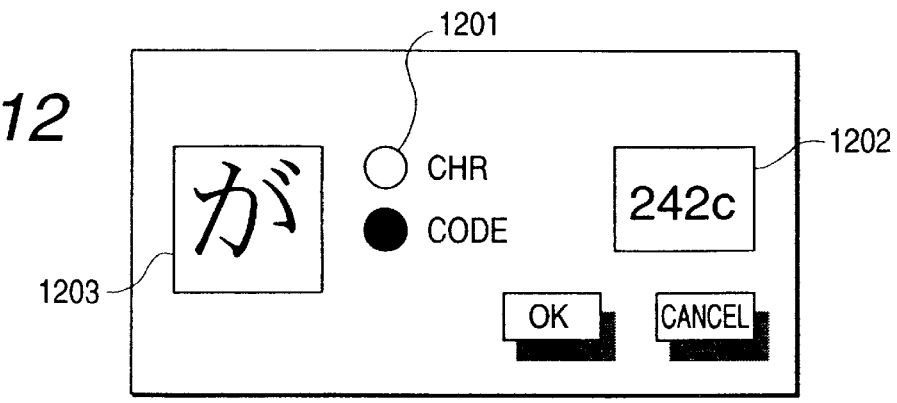
FIG. 12 is a view which shows a display example of a window that makes character designations changeable.

When the "Character Register" button 903 is operated (clicked), the character designated in the step S1001 is defined as the initial value of a character to be registered in step S1006, and the data on the initial value is displayed in the character frame 1202. When the data displayed in the character frame 1202 should be modified, the character to be registered for such character image is designated by means of the keyboard 106 in step S1007. In step 1008, the amount of distinctive feature of the image of the image frame 1203 and the data on the character frame 1202 are allowed to correspond with each other, and stored on the user's dictionary. Thus, the character registration is completed, and the recognition dictionary is updated. As shown in FIG. 12, it may be possible to make the button 1201 changeable for the intended designation of the character in the step S1007, which is executed by use of a character pattern or by the application of a character code. In response to the designation made by means of this button 1201, the display 906 of the character pattern can be switched over to the display 1202 of the charger code of the character pattern.

Here, in accordance with the present embodiment, the description has been made of the arrangement that the document image of an object to be recognized is read out from the scanner 108, but it may be possible to store the document image on a floppy disc or other storing media, for example, and then, the image may be read from such source or received through a line. Therefore, the present invention is not necessarily limited to the embodiment described above.

Also, it may be possible to apply the present invention to a system comprising a plurality of equipment or to an apparatus comprising a single equipment. Also, the present invention is applicable to a case where a program is provided for a system or an apparatus for the achievement of the objectives thereof. Therefore, it is of course possible to use a storing medium in which the program that performs the functions described above is incorporated or to make an arrangement so that a program is fetched and provided for an apparatus for the intended processing.

What is claimed is:

1. An apparatus for recognizing characters, comprising:
   character designating means for designating a desired character from a text of a character recognition result of a plurality of character images in an input image;
   displaying means for displaying the input image together with one frame surrounding a part of the input image corresponding to the designated character, wherein said designated character is a character to be output as the character recognition result for the part of the input image;
   transforming means for transforming the frame into another frame having a proper size to be cut off on the input image; and
   registering means for registering an image surrounded by said another frame and newly input character information corresponding to the image into a recognition dictionary for use in a following character recognition.

2. An apparatus according to claim 1, wherein said apparatus is provided with character input means for inputting the character information.

3. An apparatus according to claim 1, wherein said registering means further edits the image surrounded by the transformed frame.

4. An apparatus according to claim 1, wherein said transforming of the frame is transforming of the size of the frame.

5. An apparatus according to claim 1, wherein said transforming of the frame is transforming of the position of the frame.

6. An apparatus according to claim 1, wherein said transforming of the frame is transforming of the size and position of the frame.

7. An apparatus according to claim 1, wherein said character designating means designates a desired character by selecting the desired character on the display means.

8. An apparatus according to claim 1, wherein said registering means extracts data on a distinctive feature of the image surrounded by the transformed frame, and registers said extracted data.

9. An apparatus according to claim 1, wherein said image displaying means displays an edit designation mark together with the character image, the edit designation mark for editing said character image.

10. An apparatus according to claim 1, wherein said character information is input by a character keyboard.

11. An apparatus according to claim 1, wherein said character information is input by means for inputting character codes.

12. An apparatus according to claim 1, wherein said apparatus further comprises character data displaying means for displaying character data of the character designated by said character designating means.

13. An apparatus according to claim 1, wherein said apparatus further comprises:
   character data displaying means for displaying character data of the character designated by said character designating means; and
   modifying means for modifying the character data displayed by said character data displaying means
   wherein the character information registered by said registering means into the recognition dictionary is the character data modified by said modifying means.

14. An apparatus according to claim 1, wherein said input image is input by a scanner.

15. An apparatus according to claim 1, wherein said apparatus is provided with a pointing device for inputting edit information for editing said frame.

16. An apparatus according to claim 1, wherein said apparatus further comprises:
   recognition means for recognizing said input image;
   recognition result storage means for storing resultant character recognized by said recognition means and positional information for discriminating the input image serving as the recognition source of said character from said input correspondingly,
   wherein said displaying means displays the input image and a frame surrounding a character image in the input image in accordance with the information of said designated character stored on said recognition result storage means.

17. An apparatus according to claim 1, wherein the input image includes at least the character images.

18. A method for recognizing characters, comprising the steps of:
   designating a desired character from a text of a character recognition result of a plurality of character images in an input image;
   displaying the input image together with one frame surrounding a part of the input image corresponding to the designated character, wherein said designated character is a character to be output as the character recognition result for the part of the input image;
   transforming the frame into another frame having a proper size to be cut off on the input image; and
   registering an image surrounded by said another frame and newly input character information corresponding to the image into a recognition dictionary for use in a following character recognition.

19. A method according to claim 18, wherein said method further comprises the step of inputting the character information.

20. A method according to claim 18, wherein said image surrounded by the transformed frame is further edited in the registering step.

21. A method according to claim 18, wherein said transforming of the frame is transforming of the size of the frame.

22. A method according to claim 18, wherein said transforming of the frame is transforming of the position of the frame.

23. A method according to claim 18, wherein said transforming of the size and position of the frame.

24. A method according to claim 18, wherein said character designating step is to designate a desired character by selecting the desired character on display means.

25. A method according to claim 18, wherein said registering step is to extract data on a distinctive feature of the image surrounded by the transformed frame, and to register said extracted data.

26. A method according to claim 18, wherein said method comprises a step of displaying an edit designation mark for editing said character image, and at the same time, displaying the character image serving as the recognition source of said designated character.

27. A method according to claim 18, wherein said character information is input by a character keyboard.

28. A method according to claim 18, wherein said character information is input by means for inputting character codes.

29. A method according to claim 18, wherein said method further comprises a step of displaying character data of said designated character on character data displaying means.

30. A method according to claim 18, wherein said method further comprises the steps of:
   displaying character data of said designated character; and
   modifying said displayed character data,
   wherein registering the character information registers said modified character data.

31. A method according to claim 18, wherein said input image is input by a scanner.

32. A method according to claim 18, wherein edit information for editing said frame is input by a pointing device.

33. A method according to claim 18, wherein said method further comprises the steps of:
   recognizing said input image;
   storing recognition result of said recognizing step and storing positional information for discriminating the input image serving as the recognition source of said character from said input image data, while enabling them to correspond with each other; and
   displaying the input image and a frame surrounding a character image in the input image in accordance with the information of said designated character stored in said storing step.

34. A method according to claim 18, wherein the input image includes at least the character images.

35. A memory medium storing computer-executable process steps, the process steps comprising:
   a designating step for designating a desired character from a text of a character recognition result of a plurality of character images in an input image;
   a displaying step for displaying the input image together with one frame surrounding the input image corresponding to the designated character, wherein said designated character is a character to be output as the character recognition result for the part of the input image;
   a transforming step for transforming the frame into another frame having a proper size to be cut off on the input image displayed by said displaying means; and
   a registering step for registering an image surrounded by said another frame and newly input character information corresponding to the image into a recognition dictionary for use in a following character recognition.

* * * * *

UNITED STATES PATENT AND TRADEMARK OFFICE
CERTIFICATE OF CORRECTION

PATENT NO. : 6,456,739 B1
DATED : September 24, 2002
INVENTOR(S) : Hiroaki Ikeda It is certified that error appears in the above-identified patent and that said Letters Patent is hereby corrected as shown below:

Column 3,
Line 9, "of," should read -- of --; and
Line 19, "such a" should read -- such as a --.

Column 10,
Line 45, "means" should read -- means, --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,456,739 B1
DATED         : September 24, 2002
INVENTOR(S)   : Hiroaki Ikeda It is certified that error appears in the above-identified patent and that said Letters Patent is hereby corrected as shown below:

Column 7,
Line 65, "recognized" (second occurrence) should read -- recognize --.

Column 9,
Line 5, "precess" should read -- process --.

Column 11,
Line 31, "forming" should read -- forming of the frame is transforming --.

Signed and Sealed this

Seventh Day of October, 2003

JAMES E. ROGAN
*Director of the United States Patent and Trademark Office*